(12) United States Patent
Takahashi

(10) Patent No.: US 7,389,594 B2
(45) Date of Patent: Jun. 24, 2008

(54) PERIPHERAL SURFACE SHAPE MEASURING APPARATUS OF ROLL-LIKE OBJECT

(75) Inventor: Shinsuke Takahashi, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/153,408

(22) Filed: Jun. 16, 2005

(65) Prior Publication Data

US 2005/0278968 A1 Dec. 22, 2005

(30) Foreign Application Priority Data

Jun. 16, 2004 (JP) ............................. 2004-178503

(51) Int. Cl.
*G01B 5/20* (2006.01)
(52) U.S. Cl. ............................. 33/554; 33/657; 33/549
(58) Field of Classification Search .................. 33/710, 33/655, 657, 548, 549, 550, 553, 555, 554, 33/501.02

See application file for complete search history.

(56) References Cited

U.S. PATENT DOCUMENTS

| | | | | |
|---|---|---|---|---|
| 273,065 | A * | 2/1883 | Gray | 33/657 |
| 759,233 | A * | 5/1904 | Bond | 33/710 |
| 1,008,842 | A * | 11/1911 | Mair | 33/548 |
| 1,477,206 | A * | 12/1923 | Blood | 33/549 |
| 2,224,728 | A * | 12/1940 | Gulliksen | 33/501.02 |
| 2,609,609 | A * | 9/1952 | Moss | 33/549 |
| 3,795,055 | A * | 3/1974 | Zucco | 33/550 |
| 4,122,607 | A * | 10/1978 | Hopf | 33/555 |
| 4,351,115 | A * | 9/1982 | Possati | 33/555 |
| 4,433,485 | A * | 2/1984 | Keszei et al. | 33/554 |
| 4,674,193 | A * | 6/1987 | Wertepny et al. | 33/550 |
| 4,914,827 | A * | 4/1990 | Cook | 33/554 |
| 4,916,824 | A * | 4/1990 | Shimazutsu et al. | 33/551 |
| 6,754,973 | B2 | 6/2004 | Takahashi | |

FOREIGN PATENT DOCUMENTS

| | | | |
|---|---|---|---|
| JP | 56055805 A | * | 5/1981 |
| JP | 61-293577 A | | 12/1986 |
| JP | 8-102064 A | | 4/1996 |
| JP | 2002-168616 A | | 6/2002 |

* cited by examiner

Primary Examiner—Christopher W Fulton
(74) Attorney, Agent, or Firm—Sughrue Mion, PLLC

(57) ABSTRACT

A peripheral surface shape measuring apparatus of a roll-like object which measures a peripheral surface shape of the roll-like object such as a magnetic tape bulk roll, comprising a pair of receiving portions on which both ends of a core of the roll-like object are placed, a receiving portion horizontally moving device which moves the pair of receiving portions in an axial direction of the roll-like object, a receiving portion vertically moving device which moves up and down the pair of receiving portions, a position sensor having a probe with a tip urged in a direction of abutting against a surface of the roll-like object to measure the peripheral surface shape of the roll-like object and a sensor moving device which moves the position sensor in the axial direction of the roll-like object.

2 Claims, 7 Drawing Sheets

PERIPHERAL SURFACE SHAPE MEASURING APPARATUS OF ROLL-LIKE OBJECT

BACKGROUND OF THE INVENTION

1. Field of the Invention

The present invention relates to a peripheral surface shape measuring apparatus of a roll-like object, and more particularly, relates to a peripheral surface shape measuring apparatus of a roll-like object which measures a peripheral surface shape of a huge roll-like object such as a magnetic tape bulk roll and judges whether or not the peripheral surface of the roll-like object has a poor shape such as a curve.

2. Related Art

Magnetic tapes are made by cutting a wide magnetic tape bulk roll into tapes with the same narrow width. However, in roll forming of a magnetic tape bulk roll, a winding force at both ends of the magnetic tape bulk roll is slightly different from a winding force at the center, and thus, the roll peripheral surface often has a shape such that the center swells like a curve along an axial direction of the roll.

Another factor for such a peripheral surface shape is that a raw magnetic tape is coated, wound and then stored for a long time, and thus subjected to plastic deformation.

A magnetic tape obtained from the magnetic tape bulk roll having the peripheral surface shape such that the center greatly swells like a curve does not have a linear shape but has a curved shape. The use of such a magnetic tape having a curved shape causes poor electrical output or the like and lowers reliability as a product. Thus, coating with as even thickness as possible is required for preventing such a defect.

On the other hand, in view of improvement in productivity, providing thick coating at the center is also required for more stable conveyance as disclosed in Japanese Patent Application Laid Open No. 61-293577. This causes winding tension to act more strongly on ends than the center to stabilize winding when the raw magnetic tape is wound around a winding core. This can prevent defects such as winding displacement or longitudinal wrinkles.

As described above, in order to satisfy both the contradictory requirements of "the coating with the even thickness" and "the thick coating at the center", extremely accurate thickness adjustment is required. This requires precise measurement of the shape of the magnetic tape bulk roll before cutting of the magnetic tape bulk roll.

Particularly, in recent years, the width of a recording track has become increasingly narrower with higher densities of a magnetic recording medium, and thus higher dimensional accuracy of a magnetic tape bulk roll and a medium (a magnetic tape) has been required.

Various methods for measuring the shape of a magnetic tape bulk roll have been proposed (Japanese Patent Application Laid Open No. 8-102064 and Japanese Patent Application Laid Open No. 2002-168616, or the like).

Japanese Patent Application Laid Open No. 8-102064 discloses an apparatus which measures the shape of a magnetic tape bulk roll using a contact sensor that runs in parallel with a core of the magnetic tape bulk roll.

Japanese Patent Application Laid Open No. 2002-168616 discloses an apparatus which measures the shape of a magnetic tape bulk roll using a contact sensor that pinches the magnetic tape bulk roll from both sides.

SUMMARY OF THE INVENTION

However, the conventional techniques in Japanese Patent Application Laid Open No. 8-102064 and Japanese Patent Application Laid Open No. 2002-168616 do not solve the following problems.

Specifically, the apparatus in Japanese Patent Application Laid Open No. 8-102064 has an advantage of easy measurement of the shape of the magnetic tape bulk roll, but the shape of the magnetic tape bulk roll is obtained from a relative position among the core of the magnetic tape bulk roll, a surface of the magnetic tape bulk roll, and a rail shaft of the sensor, and thus poor parallelism between the rail shaft of the sensor and the core of the magnetic tape bulk roll prevents a precise value from being obtained. For the same reason, poor accuracy of the measuring apparatus prevents a precise value from being obtained.

In order to solve these problems, increased holding rigidity of the sensor or an improved method for installing the sensor and the magnetic tape bulk roll is required, which increases the size and costs of the apparatus to place a limit on implementation.

On the other hand, the apparatus in Japanese Patent Application Laid Open No. 2002-168616 is achieved in order to solve the problems of Japanese Patent Application Laid Open No. 8-102064, but has a structure in which the magnetic tape bulk roll is pinched from both sides, and thus automation for improvement in productivity may make a configuration complex to increase costs of the apparatus.

Further, the conventional apparatuses have problems that the magnetic tape bulk roll cannot be precisely positioned in measurement or the magnetic tape bulk roll is deformed in measurement to prevent precise measurement.

FIG. 12 is a perspective view of a state where a roll-like object 14 (a magnetic tape bulk roll) is supported by a holder 1 used in the conventional apparatus. The roll-like object 14 is configured by winding a raw magnetic tape 14B around a cylindrical core 14A.

The holder 1 includes core receiving mounts 3 and 3 standing on both ends along the length of a base plate 2, and is configured to receive both ends of the core 14A of the roll-like object 14 on upper end surfaces of the core receiving mounts 3 and 3. V-blocks are sometimes used instead of the core receiving mounts 3 and 3.

The holder 1 on which the roll-like object 14 is supported is conveyed by a belt convener, and set below a measuring apparatus. However, the total weight of the holder 1 and the roll-like object 14 is relatively heavy, and it is often difficult to precisely set the base plate 2 of the holder 1 below the measuring device.

On the other hand, FIG. 13 is a sectional view of a state where a roll-like object 14 (a magnetic tape bulk roll) is supported by taper shafts used in the conventional apparatus. In this configuration, taper shafts 5 and 5 are inserted into both ends of a core 14A of the roll-like object 14 as indicated by the arrows to hold the core 14A with a central axis thereof aligned with central axes of the taper shafts 5 and 5. However, such a holding method often causes deformation in the roll-like object 14 to prevent precise measurement. Also, such a holding method requires an apparatus with high accuracy, which increases costs to place a limitation on implementation.

The invention has been achieved in view of the above described circumstances, and has an object to provide a peripheral surface shape measuring apparatus of a roil-like object which can simply and accurately measure a peripheral surface shape of the roll-like object.

In order to achieve the above described object, the present invention provides a peripheral surface shape measuring apparatus of a roll-like object which measures a peripheral surface shape of the roll-like object such as a magnetic tape bulk roll, including: a pair of receiving portions on which both ends of a core of the roll-like object are placed; a receiving portion horizontally moving device which moves the pair of receiving portions in an axial direction of the roll-like object; a receiving portion vertically moving device which moves up and down the pair of receiving portions; a position sensor having a probe with a tip urged in a direction of abutting against a surface of the roll-like object to measure the peripheral surface shape of the roll-like object; and a sensor moving device which moves the position sensor in the axial direction of the roll-like object.

According to the invention, the apparatus includes the pair of receiving portions on which the both ends of the core of the roll-like object are placed, the moving devices which moves the receiving portions in the axial direction of the roll-like object, and the moving device which moves up and down the receiving portions, the self-weight of the roll-like object is supported at the both ends, and the position sensor having the probe with the tip urged against the surface of the roll-like object is moved in the axial direction of the roll-like object to measure the peripheral surface shape of the roll-like object, thereby allowing the peripheral surface shape of the roll-like object to be simply and accurately measured.

Specifically, the self-weight of the roll-like object is supported at the both ends, thereby preventing defects such as deformation in the roll-like object. Also, the apparatus includes two types of moving devices: the device which moves the pair of receiving portions in the axial direction of the roll-like object, and the device which moves up and down the receiving portions, thereby facilitating precise setting of the roll-like object.

In the present invention, it is preferable that flange portions that abut against end surfaces of the core of the roll-like object extend from the receiving portions, and the movement by the receiving portion horizontally moving device allows the core of the roll-like object to be held between the flange portions. Thus, the core of the roll-like object can be held between the flange portions, thereby ensuring a support state of the roll-like object and allowing accurate measurement of the peripheral surface shape of the roll-like object.

In the present invention, it is preferable that an upper surface of each of the receiving portions has a cylindrical shape with a diameter smaller than an inner diameter of the core of the roll-like object. The receiving portion having such an upper surface shape allows stable support of the roll-like object and accurate measurement of the peripheral surface shape of the roll-like object.

In the present invention, it is preferable that an upper surface of each of the receiving portions has a concave cylindrical shape with a diameter larger than an outer diameter of the core of the roll-like object. The receiving portion having such an upper surface shape also allows stable support of the roll-like object and accurate measurement of the peripheral surface shape of the roll-like object.

In the present invention, it is preferable that a pressing device which presses the roll-like object downward is provided. Providing such a pressing device prevents measurement errors caused by rising or jumping of the roll-like object and allows accurate measurement of the peripheral surface shape of the roll-like object.

In the present invention, it is preferable that the pressing device is provided in the sensor moving device. This simplifies a configuration of the apparatus.

As described above, according to the present invention, the peripheral surface shape of the roll-like object can be simply and accurately measured.

DETAILED DESCRIPTION OF THE PREFERRED EMBODIMENTS

Now, an embodiment of a peripheral surface shape measuring device of a roll-like object according to the present invention will be described in detail with reference to the accompanying drawings.

Figure 1:
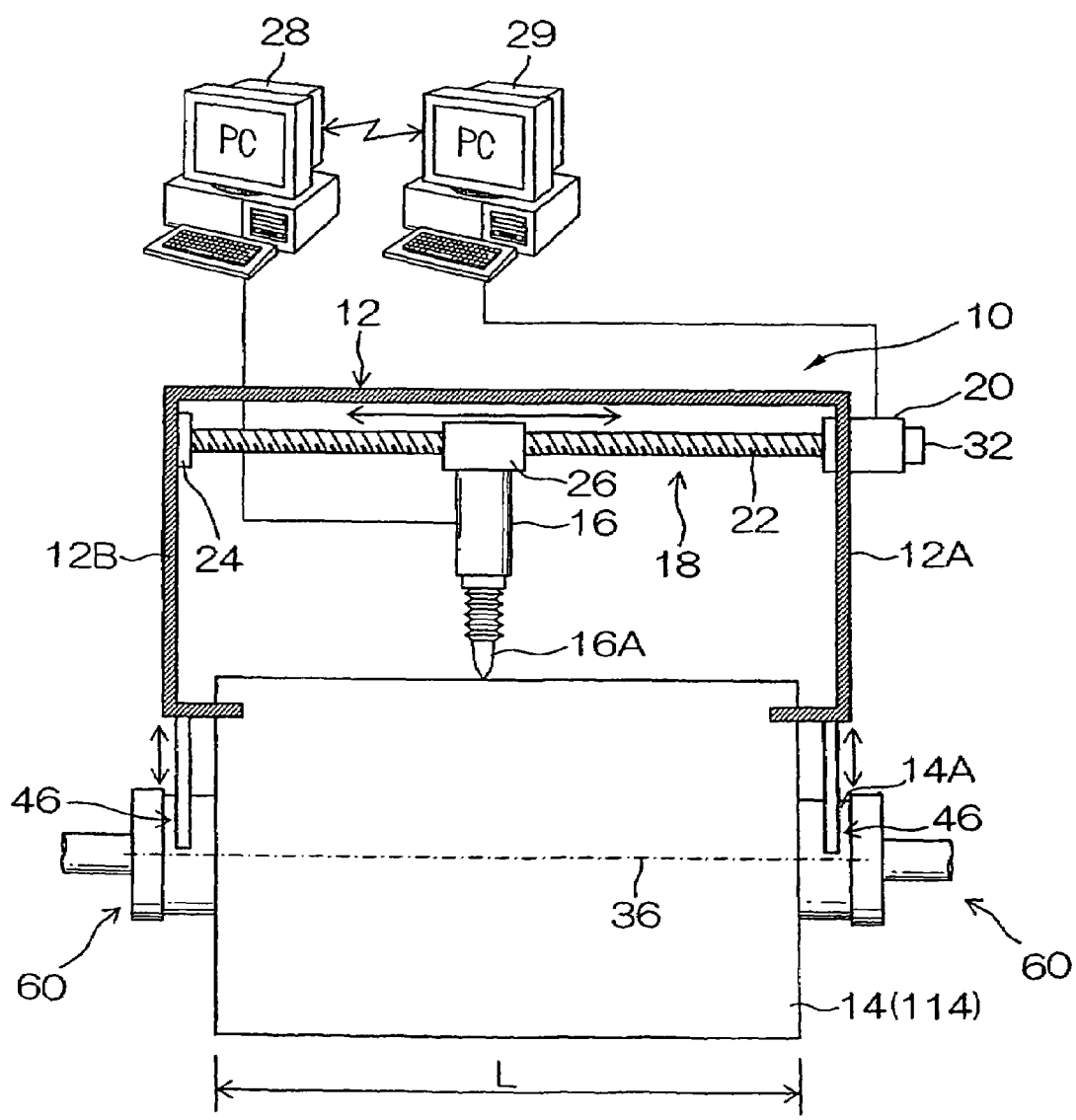
FIG. 1 illustrates a whole configuration of a peripheral surface shape measuring device of a roll-like object to which the present invention is applied.

FIG. 1 illustrates a whole configuration of a peripheral surface shape measuring device of a roll-like object to which the present invention is applied. As shown in FIG. 1, a peripheral surface shape measuring apparatus 10 mainly includes a position sensor 16 having a probe (a feeler) 16A with a tip urged in a diametrical direction of a roll-like object 14, and a moving device 18 (s sensor moving device) which moves the position sensor 16 in an axial direction of the roll-like object 14, provided in a casing 12 with an open bottom. When a peripheral surface shape of the roll-like object 14 is measured, the casing 12 is detachably placed on the roll-like object 14.

Figure 9:
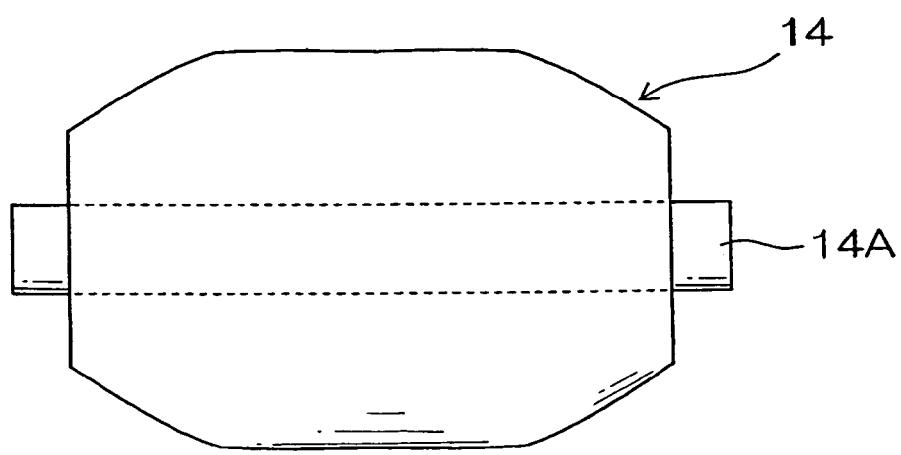
FIG. 9 illustrates a curved peripheral surface shape of the roll-like object.

As shown in FIG. 9, in many cases, the roll peripheral surface of the roll-like object 14 has a shape such that the center swells like a curve along the axial direction of the roll as described above. The roll-like object 14 is supported by roll-like object support devices 60 and 60 described below.

The moving device 18 is constituted by a horizontally driving motor 20 and a ball screw 22. Specifically, the ball screw 22 has one end connected to a motor shaft of the horizontally driving motor 20 through a side plate 12A at a right end of the casing 12 and the other end supported by a bearing member 24 secured to a side plate 12B at a left end of the casing 12. The horizontally driving motor 20 is supported by the side plate 12A at the right end of the casing 12.

The ball screw 22 is screwed into a ball nut 26 to which the position sensor 16 is secured.

The position sensor 16 is connected to a personal computer 28, and measured data is processed by the personal computer 28. The horizontally driving motor 20 is connected to a personal computer 29, and driving of the horizontally driving motor 20 is controlled by the personal computer 29. Further, a rotary encoder 32 is connected to the horizontally driving motor 20 to allow a horizontal position of the ball nut 26 to be detected. The personal computer 28 and the personal computer 29 can communicate with each other via a data circuit.

With the above described configuration, the horizontally driving motor 20 is rotatably driven to rotate the ball screw 22 and move the position sensor 16 in the axial direction (toward one end or the other end) of the roll-like object 14.

The position sensor 16 is configured to measure the peripheral surface shape of the roll-like object 14 along with the movement of the moving device 18 (the ball nut 26), and a contact position sensor is used. In many cases, the roll-like object 14 such as the magnetic tape bulk roll is wound loosely at an outermost layer, and when the roll-like object 14 is measured by a non-contact position sensor, a true shape of the roll-like object 14 sometimes cannot be detected. Thus, the position sensor 16 is used having the probe with the tip that comes into contact with the surface of the roll-like object 14 with a predetermined urging force.

As the position sensor 16, various types of known sensors may be used according to the size, the shape, or required accuracy of the roll-like object 14, such as a position sensor using interference such as moire fringes (generally referred to as "a linear scale" or "a moiré scale"), or a position sensor using an operating transformer.

Generally, a sensor having a direct-acting probe is preferably used as the position sensor 16, but a sensor having a lever probe may be used. In short, a position sensor having a probe with a tip urged in a diametrical direction of the roll-like object 14 may be applied to the present invention.

Generally, a minimum read value and an operation distance of the position sensor 16 of the above described type have a tradeoff relationship, and it is preferable to select the type of the position sensor 16 according to the size, the shape, or required accuracy of the roll-like object 14.

A detected displacement amount of the position sensor 16 when the position sensor 16 is moved in the axial direction of the roll-like object 14 by the moving device 18 is measured by a change amount of a diameter in each position in the axial direction of the roll-like object 14, and the change of the diameter expresses the peripheral surface shape.

Figure 2:
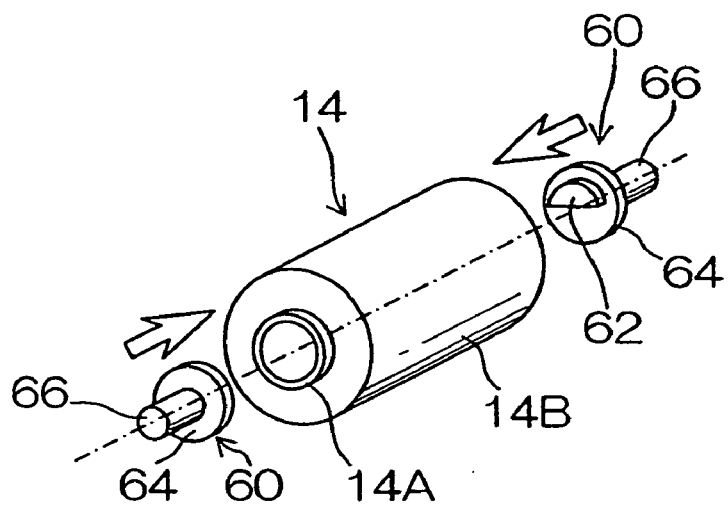
FIG. 2 is a perspective view of a configuration of a roll-like object support device.
Figure 3:
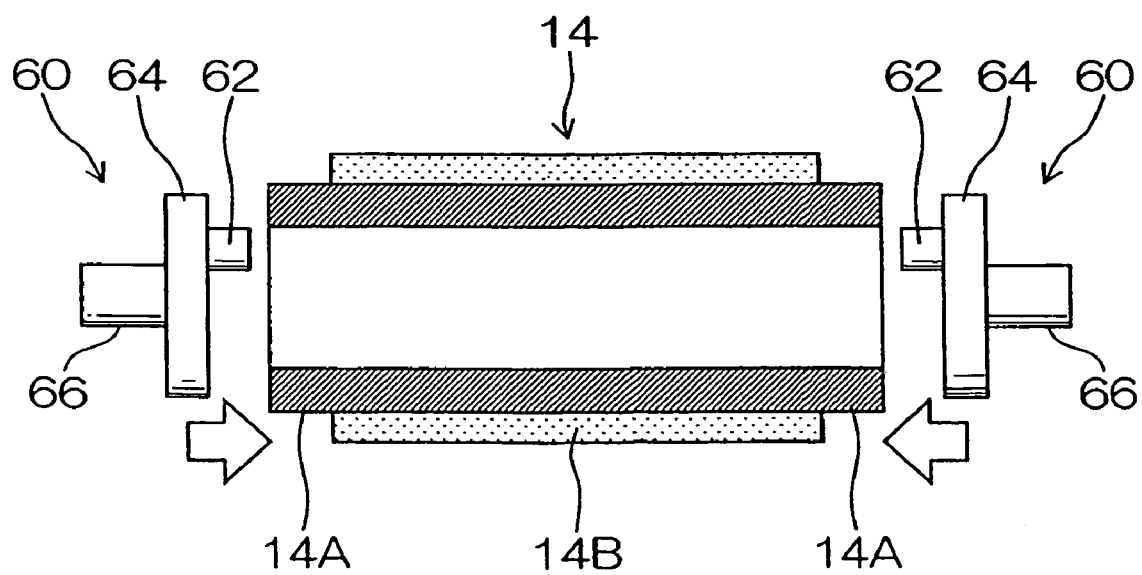
FIG. 3 is a sectional view of a state where the roll-like object is supported by the roll-like object support device.
Figure 4:
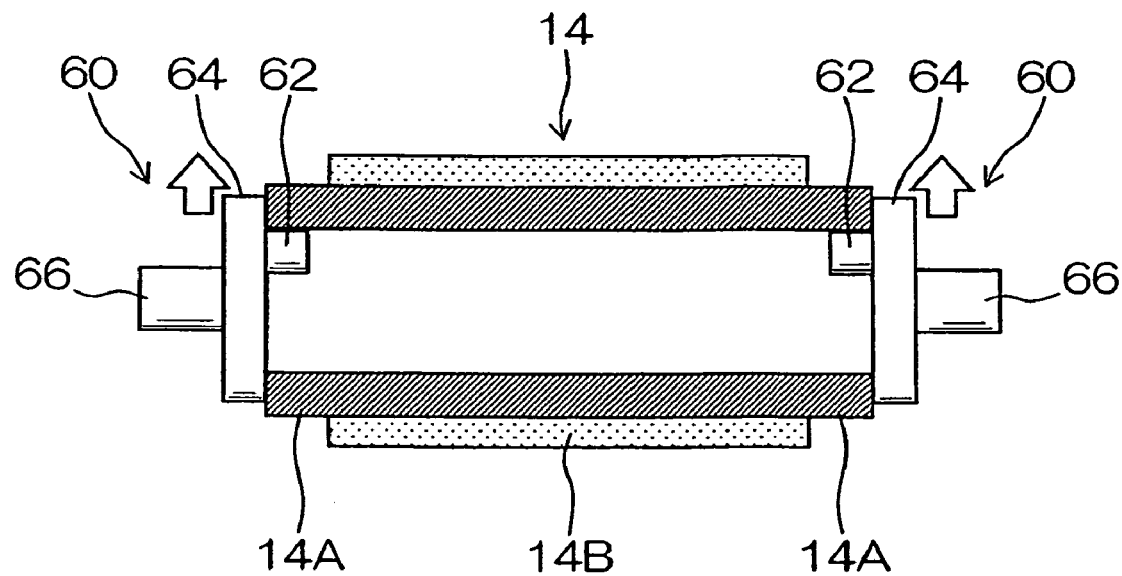
FIG. 4 is a sectional view of a state where the roll-like object is supported by the roll-like object support device.
Figure 5:
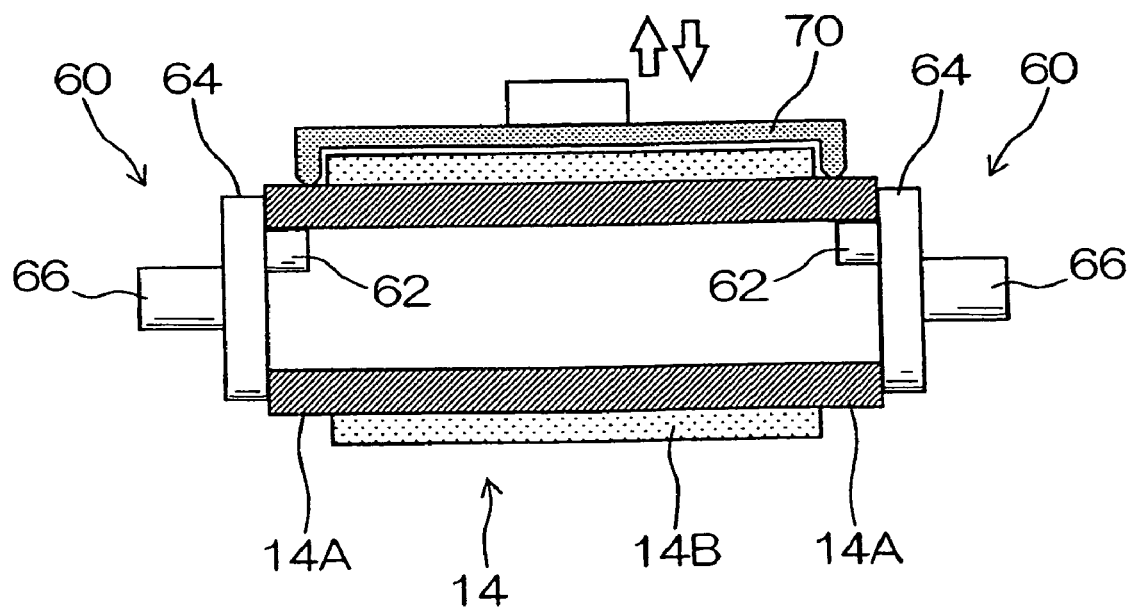
FIG. 5 is a sectional view of a state where the roll-like object is supported by the roll-like object support device.

The moving device 18 is not limited to the configuration in FIG. 1, but any device (for example, a monorail type device) may be used which can linearly move the position sensor 16 in the axial direction of the roll-like object 14 in a stable manner Next, a configuration of the roll-like object support device 60 that is a characteristic feature of the present invention will be described. FIG. 2 is a perspective view of the configuration of the roll-like object support device 60, and FIGS. 3 to 5 are sectional views of time-series states where the roll-like object 14 is supported by the roll-like object support device 60.

As shown in FIG. 2 or the like, the roll-like object support device 60 includes receiving portions 62 and 62 on which both ends of the core of the roll-like object 14 are placed, flange portions 64 and 64 extending from the receiving portions 62 and 62, shafts 66 and 66 extending from the centers of the flange portions 64 and 64, a receiving portion horizontally moving device (the shafts 66 and 66 only are shown) which moves the receiving portions 62 and 62 in the axial direction of the roll-like object 14, and a receiving portion vertically moving device (not shown) which moves up and down the receiving portions 62 and 62.

The roll-like object support device 60 is a device which supports the self-weight of the roll-like object 14 at both ends by the receiving portions 62 and 62. The roll-like object support device 60 also has a function that movement by the receiving portion horizontally moving device causes the core of the roll-like object 14 to be held between the flange portions 64 and 64. Then, the roll-like object support device 60 is configured so that the receiving portion vertically moving device moves up and down the roll-like object 14 while supporting the roll-like object 14 and sets the roll-like object 14 in the measurement position by the peripheral surface shape measuring apparatus 10.

An upper surface of each of the receiving portions 62 and 62 has a cylindrical shape with a diameter smaller than an inner diameter of the core 14A of the roll-like object 14. The receiving portion 62 having such an upper surface shape allows stable support of the roll-like object 14 and accurate measurement of the peripheral surface shape of the roll-like object 14. The diameter of the cylindrical shape of the receiving portion 62 may be 2 to 10 mm smaller than the inner diameter of the core 14A of the roll-like object 14. Too small a difference in the diameters makes setting difficult, while too large a difference in the diameters causes poor stability of the core 14A of the roll-like object 14, both of which are not preferable.

As shown in FIG. 2, the receiving portion 62 has a semi-cylindrical shape with an upper half only, and a lower half of the cylindrical shape is removed. Such a shape has an advantage of facilitating setting. However, the receiving portion 62 may have a simple cylindrical shape.

As the receiving portion horizontally moving device, various types of known devices may be used which have a function of moving the receiving portion 62 in the axial direction of the roll-like object 14 as indicated by the arrows in FIGS. 2 and 3. For example, a configuration may be used in which a bolt device that is screwed into a nut device secured on a mount of the receiving portion vertically moving device is rotated (manually or automatically by a motor or the like), and an end surface of the shaft 66 is pressed by a tip of the bolt device for driving.

As the receiving portion vertically moving device, various types of known devices may be used which have a function of moving up and down the receiving portion horizontally moving device including the receiving portion 62 as indicated by the arrows in FIG. 4. For example, a configuration may be used in which a bolt device that is screwed into a nut device secured on a mount provided below the receiving portion horizontally moving device is rotated (manually or automatically by a motor or the like), and the receiving portion horizontally moving device including the receiving portion 62 is moved up and down by the bolt device.

Other configurations that may be used as the receiving portion horizontally moving device and the receiving portion vertically moving device include a cylinder device (such as an air cylinder or a hydraulic cylinder), a jacking device, and an ultrasonic motor, or the like. In order to detect movement positions of the receiving portion horizontally moving device and the receiving portion vertically moving device, various types of known detecting devices such as a position sensor or a limit switch may be provided.

In addition to the above described configuration for supporting the roll-like object 14, a pressing device 70 as shown in FIG. 5 is provided. The pressing device 70 has a function of pressing the roll-like object 14 downward in addition to the function of supporting the self-weight of the roll-like object 14 with the receiving portions 62 and 62 of the roll-like object support devices 60 and 60 and the function of holding the core of the roll-like object 14 between the flange portions 64 and 64. Thus, providing the function of pressing the roll-like object 14 downward prevents measurement errors caused by rising or jumping of the roll-like object 14 and allows accurate measurement of the peripheral surface shape of the roll-like object 14.

As the pressing device 70, various types of known means, for example, a cylinder device (such as an air cylinder or a hydraulic cylinder) may be used. A configuration may be also used in which a pressing device is provided in an extending manner in lower portions of the side plates 12A and 12B of the casing 12 of the peripheral surface shape measuring apparatus 10 so as to move together with the casing 12.

Figure 6:
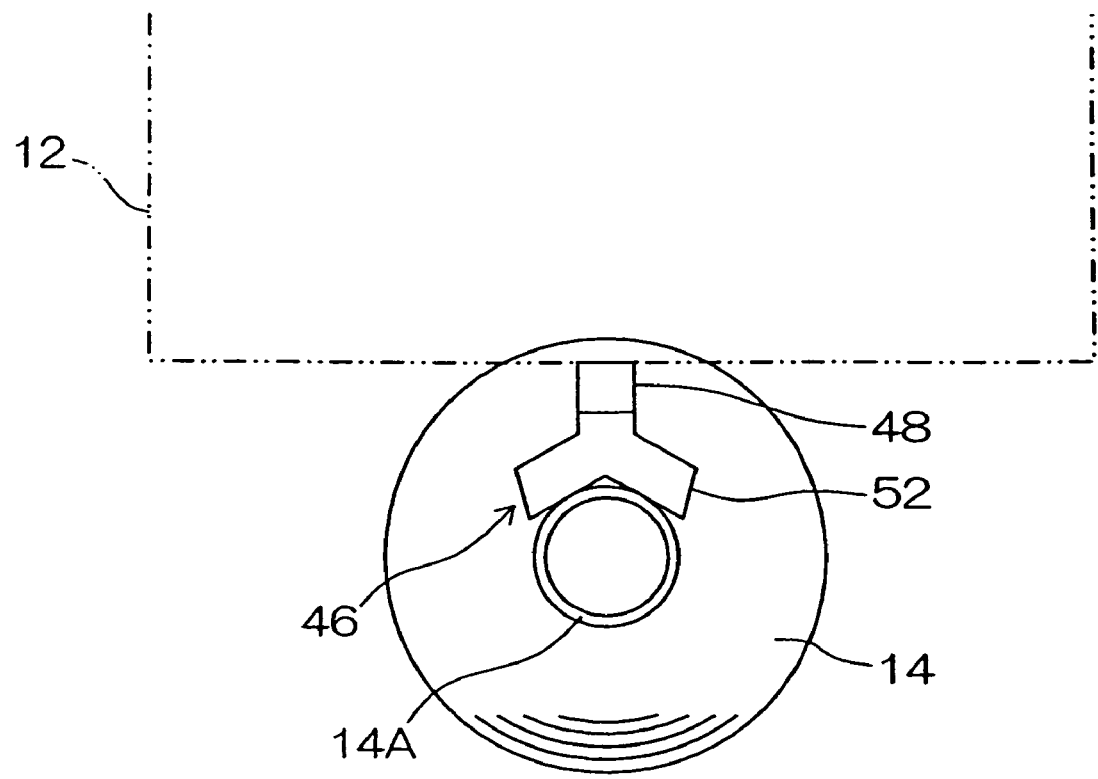
FIG. 6 illustrates a guiding device of the peripheral surface shape measuring device of a roll-like object.

Next, a guiding device 46 will be described. The guiding device 46 is a mechanism for facilitating movement of the position sensor 16 in parallel with the central axis of the roll-like object 14. FIG. 6 is a right side view of part of FIG. 1, and illustrates the guiding device 46.

The guiding device 46 is configured by providing a two-way support portion 52 in a jacking device 48. In the use of the guiding device 46, as shown in FIGS. 1 and 6, two-way support portions 52 of a pair of guiding devices 46 are caused to engage the both sides of the core 14A of the roll-like object 14 and secured, and then a pair of jacking devices 48 are used to adjust the casing 12 (the ball screw 22) so as to remove a tilt of the casing 12 relative to the core 14A. This causes the ball screw 22 to be in parallel with the core 14A, thereby allowing the position sensor 16 to be moved in parallel with the central axis of the roll-like object 14.

Next, the peripheral surface shape measuring apparatus 10 configured as described above is used to describe a method for measuring the peripheral surface shape of the roll-like object 14.

Figure 12:
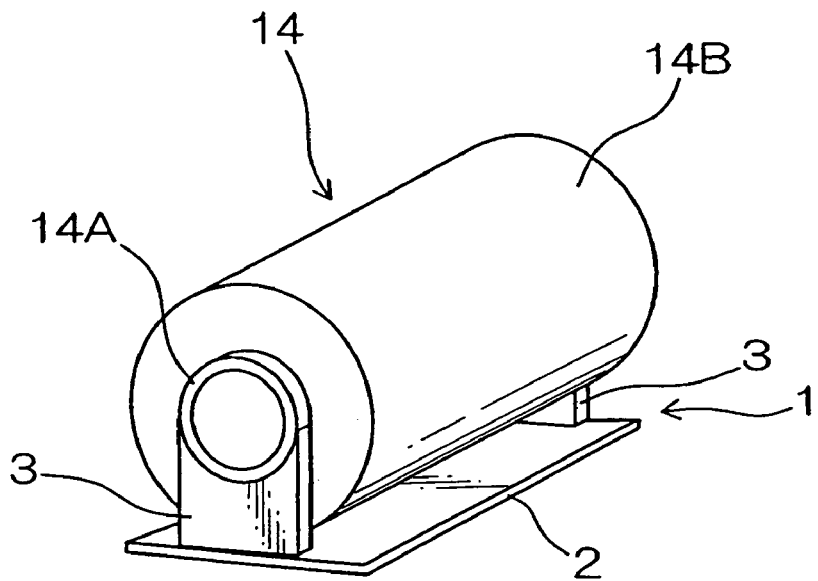
FIG. 12 is a perspective view of a state where a roll-like object (a magnetic tape bulk roll) is supported by a holder used in a conventional apparatus.
Figure 13:
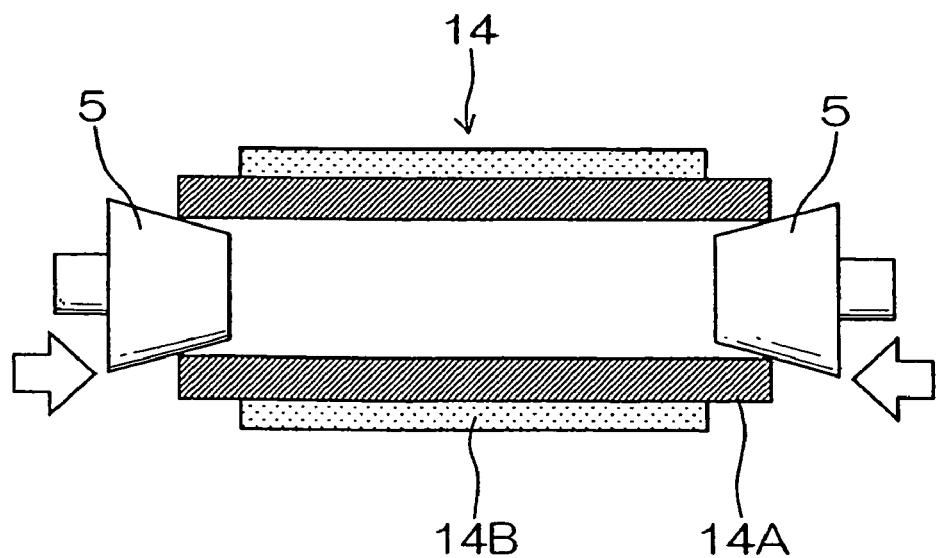
FIG. 13 is a sectional view of a state where a roll-like object (a magnetic tape bulk roll) is supported by taper shafts used in a conventional apparatus.

First, the roll-like object 14 is supported by the roll-like object support devices 60 and 60. As shown in FIGS. 2 and 3, the roll-like object support devices 60 and 60 are mounted to the roll-like object 14 that is conveyed to below the peripheral surface shape measuring apparatus 10 and supported by the holder 1 or the like shown in FIG. 12.

More specifically, the roll-like object support devices 60 and 60 are set at a height such that the receiving portions 62 and 62 can be fitted into the inner peripheral portion of the core 14A of the roll-like object 14 with space, and then the roll-like object support devices 60 and 60 are horizontally moved by the receiving portion horizontally moving device in the direction of the arrows in FIGS. 2 and 3. The roll-like object support devices 60 and 60 are then moved up by the receiving portion vertically moving device in the direction of the arrows in FIG. 4. Finally, the roll-like object 14 is pressed downward by the pressing device 70 in FIG. 5.

By the above described procedure, the self-weight of the roll-like object 14 is supported by the receiving portions 62 and 62, the core of the roll-like object 14 is held between the flange portions 64 and 64, and the roll-like object 14 is pressed downward by the pressing device 70. This stabilizes a support state of the roll-like object 14.

The following procedure actively using the flange portions 64 and 64 eliminates the need for using the pressing device 70.

First, the roll-like object support devices 60 and 60 are set at a height such that the receiving portions 62 and 62 can be fitted into the inner peripheral portion of the core 14A of the roll-like object 14 with space, and then the roll-like object support devices 60 and 60 are horizontally moved by the receiving portion horizontally moving device in the direction of the arrows in FIGS. 2 and 3. This causes the receiving portions 62 and 62 to be fitted into the inner peripheral portion of the core 14A of the roll-like object 14. At this time, the flange portions 64 and 64 are not in contact with the core of the roll-like object 14.

Then, the roll-like object support devices 60 and 60 are moved up by the receiving portion vertically moving device in the direction of the arrows in FIG. 4. This causes the roll-like object 14 to be lifted by the receiving portions 62 and 62, and the core of the roll-like object 14 is adjusted by the self-weight.

Then, the roll-like object support devices 60 and 60 are further horizontally moved by the receiving portion horizontally moving device in the direction of the arrows in FIGS. 2 and 3. This causes the core 14A of the roll-like object 14 to be held from the both ends between the flange portions 64 and 64, thereby stabilizing the support state of the roll-like object 14.

Then, the position sensor 16 is moved to an end in the axial direction (one end) of the roll-like object 14 by the moving device 18 in FIG. 1. A horizontal position coordinate of the end in the axial direction is stored in the personal computer 29 with a read value of the rotary encoder 32.

Then, the casing 12 is mounted to the roll-like object 14. Specifically, as shown in FIGS. 1 and 6, the two-way support portions 52 of the pair of guiding devices 46 are caused to engage the both sides of the core 14A of the roll-like object 14 and secured, and then the pair of jacking devices 48 are used to adjust the casing 12 so as to remove a tilt of the casing 12 relative to the core 14A. Then, a vertical position of the position sensor 16 is adjusted to be within an appropriate range of an operation distance.

Then, the horizontally driving motor 20 is rotatably driven to move the position sensor 16 to the other end. This causes the shape of the roll-like object 14 to be precisely measured, thereby obtaining actually measured peripheral surface shape data.

Then, the measured surface shape data of the roll-like object 14 is displayed on a screen of the personal computer 28.

Figure 7:
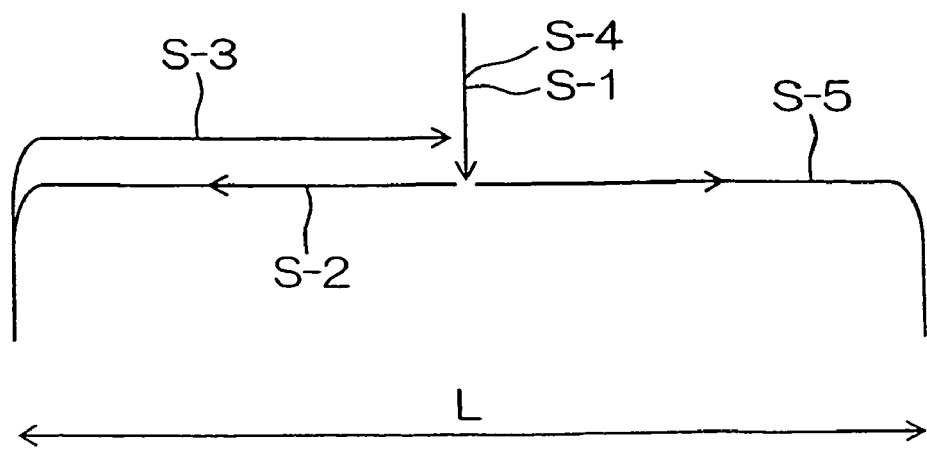
FIG. 7 illustrates moving paths of a tip of a probe of a position sensor.

Next, another method for measuring the peripheral surface shape of the roll-like object 14 using the peripheral surface shape measuring apparatus 10 will be described. The method for supporting the roll-like object 14 with the roll-like object support devices 60 and 60 is the same, and thus the description thereof will be omitted. FIG. 7 illustrates moving paths (S-1 to S-5) of the tip of the probe 16A of the position sensor 16. This measuring method is effective in precisely measuring the peripheral surface shape of the end of the roll-like object 14.

First, the position sensor 16 is moved to the center in the axial direction of the roll-like object 14 by the moving device 18. A horizontal position coordinate of the center in the axial direction is stored in the personal computer 29 with a read value of the rotary encoder 32.

Then, the casing 12 is mounted to the roll-like object 14. Specifically, as shown in FIGS. 1 and 6, the two-way support portions 52 of the pair of guiding devices 46 are caused to engage the both sides of the core 14A of the roll-like object 14 and secured, and then the pair of jacking devices 48 are used to adjust the casing 12 so as to remove a tilt of the casing 12 relative to the core 14A. Then, a vertical position of the position sensor 16 is adjusted to be within an appropriate range of an operation distance (S-1 in FIG. 7).

Then, the horizontally driving motor 20 is rotatably driven to move the position sensor 16 to a left end (one end) (S-2 in FIG. 7). At this time, the position sensor 16 overruns and the tip of the probe 16A reaches the outside of the end of the roll-like object 14. This allows the shape of the roll-like object 14 up to the end to be precisely measured.

The casing 12 is moved up to a position where the tip of the probe 16A does not come into contact with the roll-like object 14, and the horizontally driving motor 20 is rotatably driven to move the position sensor 16 to the center in the axial direction of the roll-like object 14 (S-3 in FIG. 7). At this time, the position coordinate of the center in the axial direction of the roll-like object 14 has been stored in the personal computer 29, and thus positioning is precisely performed.

Then, the casing 12 is moved down to a position where the tip of the probe 16A comes into contact with the roll-like object 14, and the vertical position of the position sensor 16 is within the appropriate range of the operation distance (S-4 in FIG. 7).

Then, the horizontally driving motor 20 is rotatably driven to move the position sensor 16 to a right end (the other end) (S-5 in FIG. 7). At this time, the position sensor 16 overruns and the tip of the probe 16A reaches the outside of the end of the roll-like object 14. This causes the shape of the roll-like object 14 up to the end to be precisely measured.

Figure 8:
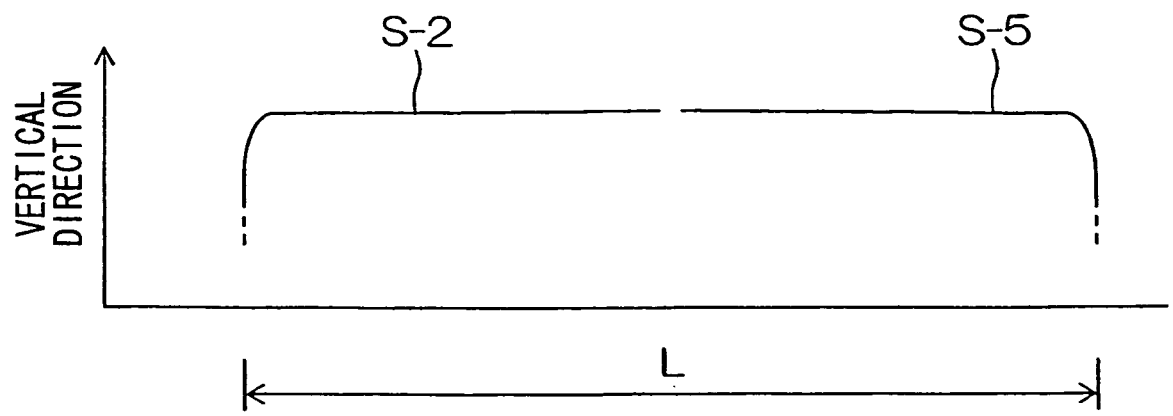
FIG. 8 is a graph of measured surface shape data of the roll-like object.

Finally, the measured surface shape data of the roll-like object 14 is displayed on the screen of the personal computer 28. FIG. 8 is a graph showing the measured surface shape data of the roll-like object 14. For the surface shape in the left half, measured data in the movement of S-2 in FIG. 7 is used, and for the surface shape in the right half, measured data in the movement of S-5 in FIG. 7 is used. The data is combined to form the surface shape data of the entire width L of the roll-like object 14.

As described above, according to the peripheral surface shape measuring apparatus 10, the peripheral surface shape of the roll-like object 14 can be simply and accurately measured.

The embodiment of the peripheral surface shape measuring device of a roll-like object according to the present invention has been described, but the present invention is not limited to the embodiment and may include various aspects.

For example, in the embodiment, the upper surface of the receiving portion 62 has the cylindrical shape with the diameter smaller than the inner diameter of the core 14A of the roll-like object 14, but the upper surface of the receiving portion has a cylindrical inner shape with a diameter larger than an outer diameter of the core 14A of the roll-like object 14.

Figure 10:
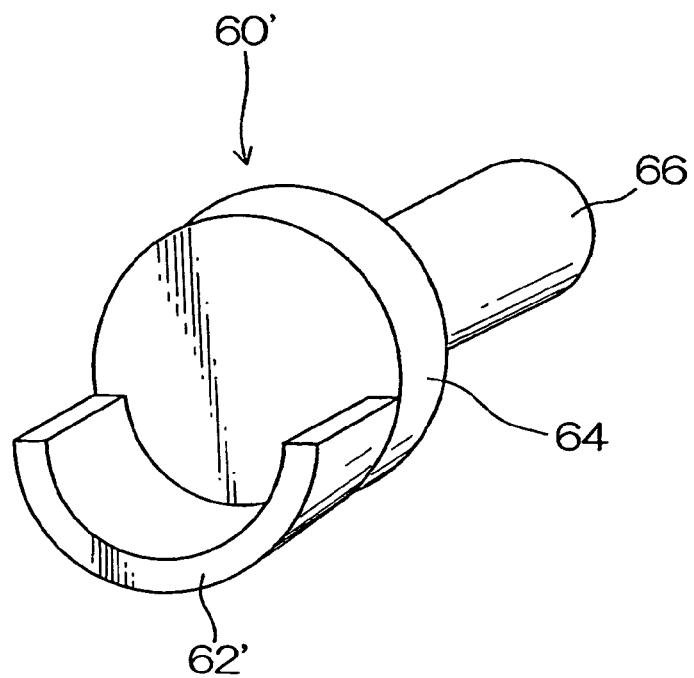
FIG. 10 is a perspective view of another embodiment of a roll-like object support device.

FIG. 10 is a perspective view of another embodiment of such a roll-like object support device. In a roll-like object support device 60', a semi-cylindrical receiving portion 62' with a diameter larger than an outer diameter of the core 14A of the roll-like object 14 is provided in an extending manner from the flange portions 64.

An upper surface of such a semi-cylindrical receiving portion 62' also allows stable support of the roll-like object 14 and accurate measurement of the peripheral surface shape of the roll-like object 14.

Particularly, when the core 14A of the roll-like object 14 is solid, the receiving portion 62 of the embodiment cannot be used, and thus the roll-like object support device 60' of the receiving portion 62' is advantageously used.

Figure 11:
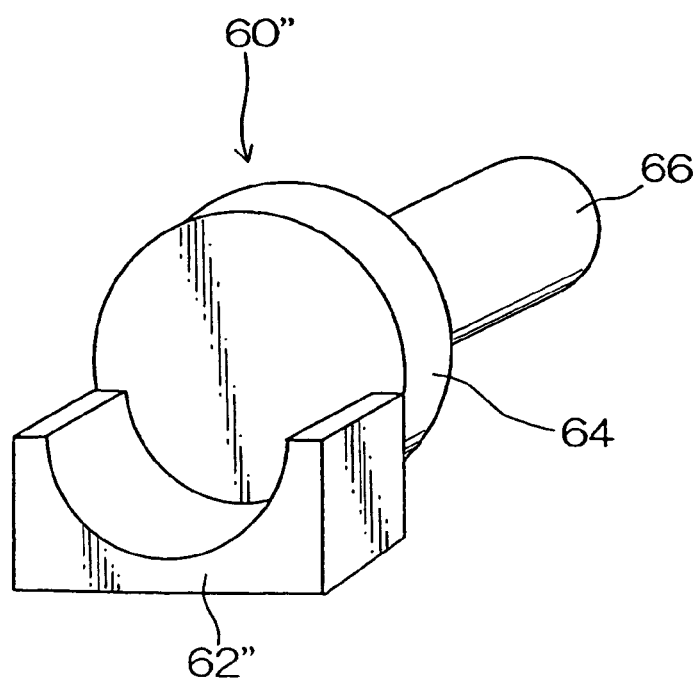
FIG. 11 is a perspective view of a further embodiment of a roll-like object support device.

FIG. 11 is a perspective view of a further embodiment of a roll-like object support device. In a roll-like object support device 60'', a receiving portion 62'' having a concave semi-cylindrical shape with a diameter larger than an outer diameter of the core 14A of the roll-like object 14 is provided in an extending manner from the flange portions 64. Specifically, an outer peripheral surface (a lower surface) of the receiving portion 62' does not need to have the cylindrical shape as in the roll-like object support device 60' in FIG. 10, but a concave surface (an upper surface) only may have a cylindrical shape.

The magnetic tape bulk roll is used as the roll-like object 14, but other roll-like object may be used. Specifically, the present invention may be applied to the field of winding a bulk-like product.

What is claimed is:

1. A peripheral surface shape measuring apparatus of a roll-like object which measures a peripheral surface shape of the roll-like object such as a magnetic tape bulk roll, comprising:
   a pair of receiving portions on which both ends of a core of the roll-like object are placed;
   a receiving portion horizontally moving device which moves the pair of receiving portions in an axial direction of the roll-like object;
   a receiving portion vertically moving device which moves up and down the pair of receiving portions;
   a position sensor having a probe with a tip urged in a direction of abutting against a surface of the roll-like object to measure the peripheral surface shape of the roll-like object; and
   a sensor moving device which moves the position sensor in the axial direction of the roll-like object; and
   wherein an upper surface of each of the receiving portions has a concave cylindrical shape with a diameter larger than an outer diameter of the core of the roll-like object; and
   wherein the receiving portions have a semi-cylindrical shape.

2. A peripheral surface shape measuring apparatus of a roll-like object which measures a peripheral surface shape of the roll-like object such as a magnetic tape bulk roll, comprising:
   a pair of receiving portions on which both ends of a core of the roll-like object are placed;
   a receiving portion horizontally moving device which moves the pair of receiving portions in an axial direction of the roll-like object;
   a receiving portion vertically moving device which moves up and down the pair of receiving portions;
   a position sensor having a probe with a tip urged in a direction of abutting against a surface of the roll-like object to measure the peripheral surface shape of the roll-like object; and
   a sensor moving device which moves the position sensor in the axial direction of the roll-like object; and
   wherein flange portions that abut against end surfaces of the core of the roll-like object extend from the receiving portions, and the movement by the receiving portion horizontally moving device allows the core of the roll-like object to be held between the flange portions; and
   wherein an upper surface of each of the receiving portions has a concave cylindrical shape with a diameter larger than an outer diameter of the core of the roll-like object; and wherein the receiving portions have a semi-cylindrical shape.

* * * * *